Patented Aug. 9, 1949

2,478,205

UNITED STATES PATENT OFFICE 2,478,205

SYNTHESIS OF PERYLENE

Milton Orchin, Pittsburgh, Pa., assignor to the United States of America as represented by the Secretary of the Interior No Drawing. Application October 25, 1946, Serial No. 705,791

3 Claims. (Cl. 260—668)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of substituted and unsubstituted perylenes.

It is an object of this invention to provide a method for the production of perylene. Another object is to provide a method for the production of substituted perylenes. Other objects will be apparent or appear hereinafter.

These objects are accomplished in accordance with this invention wherein unsubstituted or substituted 1,1'-dinaphthyl is catalytically dehydrogenated, thereby producing perylene or the correspondingly substituted perylene.

The invention accordingly comprises the method of production of perylenes.

Suitable parent substances for the production of perylene by the method of this invention include: 1,1'-dinaphthyl, a method for preparation of this compound by coupling 1-naphthylmagnesium bromide in the presence of cuprous chloride is described by Sakellarios and Kyrimis in Ber. 57, 325 (1924); and hydrogenated 1,1'-dinaphthyls, such as 3,4-dihydro-1,1'-dinaphthyl prepared from alpha naphthylmagnesium bromide and alpha tetralone.

Suitable parent substances for the production of substituted perylenes are the correspondingly substituted 1,1'-dinaphthyls, providing such substituent groups are not in the 2,2', 7, or 7' positions—such as 3, 3', 4, 4' tetramethyl-1, 1'-dinaphthyl, 3,4 dimethyl-1, 1'-dinaphthyl, and the like.

Suitable catalysts for purposes of this invention are those commonly used in organic dehydrogenation processes; such as chromia on alumina, palladium-carbon, Raney nickel, nickel on kieselguhr, and the like. While a suitable dehydrogenation catalyst may be employed in massive form, it is preferred to employ it supported upon a suitable carrier material which permits free passage of the fluid while providing a suitable intimate contact between the vaporized reactant and the supported catalyst. The preferred catalyst is a palladium-carbon catalyst prepared as follows: 12 grams of charcoal, 8 grams of palladium chloride and 24 milliliters of 40 percent formaldehyde was cooled and stirred, and 48 milliliters of 50 percent potassium hydroxide solution was added dropwise with continuous agitation. The material was filtered, washed with water until free of alkali, and then dried. Thereupon, 30 parts by weight of the dried palladium-charcoal mixture thus prepared were mixed with 70 parts by weight of asbestos and the resulting supported palladium-charcoal catalyst was employed for the dehydrogenation in accordance with this invention.

The catalytic dehydrogenation of a suitable 1,1'-dinaphthyl compound is preferably carried out in the vapor phase in this invention, and generally at temperatures sufficient to maintain the chosen 1,1'-dinaphthyl compound vaporized but below the temperature at which substantial thermal cracking takes place. A suitable temperature is between 450° and 550° centigrade, such as for example a temperature of the order of 500° centigrade.

The vaporized reactant may be passed over the catalyst at ordinary atmospheric pressure, super-atmospheric pressure, or sub-atmospheric pressure, but generally it is preferred to carry out the catalytic dehydrogenation at ordinary atmospheric pressure in the presence of a slow stream of an inert carrier gas. For example, a slow stream of hydrogen may concurrently be passed through the reaction together with the vaporized 1,1'-dinaphthyl compound. Other suitable inert carrier gases include nitrogen, helium, and argon; but hydrogen is preferred. A suitable apparatus for accomplishing this has been described and shown by Orchin in the Analytical Edition of Industrial and Engineering Chemistry, vol. 17, page 673 of October 15, 1945.

The following illustrative examples show how the invention may be carried out, but it is not limited thereto. The indicated temperatures are on the centigrade scale.

Example I

An iron pipe about 70 centimeters in length and 15 millimeters inside diameter was wrapped with asbestos and then with 24 feet of No. 22 Nichrome electrical resistance wire to serve as a heating element. The wire windings were covered with a second layer of asbestos and the wrapped pipe placed inside a cylindrical length of heat resisting glass tubing. A suitable source of electric current was then connected to the Nichrome winding and controlled through a switch and rheostat. An inner tube having an outside diameter of 14 millimeters and made of "Pyrex" glass was then inserted to form an inner lining for the iron pipe and the entire apparatus was mounted on a suitable support so that its long dimension was about 20 degrees from the horizontal. The lower portion of the inner glass tube was connected to a suitable receiver provided with means for excluding atmospheric air and the upper end of the tube was connected to a suitable device for feeding liquid reactant and hydrogen gas to the catalyst tube. Thereupon, the tube was charged with palladium-charcoal supported on asbestos as above described, a slow stream of hydrogen was admitted and a suitable means for measuring the internal temperature of the catalyst tube was connected. By means of the electrical heating element and rheostat, the temperature inside the catalyst tube was adjusted to between 480° and 500° centigrade, and then 2 grams of 1,1'-dinaphthyl were passed over the catalyst bed with an excess of hydrogen to act as a diluent carrier. The 1,1'-dinaphthyl is admitted to the catalyst chamber at the rate of about 1 gram per hour. The solid yellow colored product which collected in the receiving vessel was dissolved in about 10 milliliters of hot benzene and then cooled to room temperature, whereupon 0.17 gram of perylene crystallized and was separated by filtration, washed with small portions of ice-cold benzene, and dried. This product had a melting point of 270 degrees. The mother liquor and cold benzene washes were combined and separated by selective adsorption by passing it through a tower charged with equal parts of activated alumina and an absorbent diatomaceous earth, such as "Super-Cel." After development of the resulting chromatogram by washing with petroleum ether, the adsorbent was extruded and divided into two parts. The upper part was a yellow colored band and contained perylene. The lower was colorless but fluoresced when illuminated with ultra-violet light; this portion contained the unconverted 1,1'-dinaphthyl. The perylene portion was eluted with hot benzene whereupon an additional 0.05 gram of perylene, melting point 270 degrees, was obtained and recovered as described above. The colorless band on elution with benzene yielded 1.0 gram of pure, unchanged 1,1'-dinaphthyl, suitable for recycling.

*Example II*

Six grams of 3, 4, 3', 4'-tetrahydro-1, 1'-dinaphthyl were treated by the method of Example I modified as follows: (1) The palladium-carbon catalyst was replaced with a pelleted catalyst containing 12.5 percent by weight of chromia on alumina; (2) the catalyst temperature was maintained at 500 degrees; and (3) the reactant flow rate was about 18 grams per hour. From this reaction 0.20 gram of crystalline yellow plates were recovered that had a melting point of 276 to 278 degrees, and which did not depress the melting point of pure perylene.

As shown in the foregoing description and examples, perylene can simply and easily be prepared in relatively high yields from 1, 1'-dinaphthyl and its hydro derivatives by catalytic dehydrogenation.

While the invention has been particularly described for the production of unsubstituted perylenes, it is not limited thereto; substituted perylenes may be prepared by processing the correspondingly substituted 1, 1'-dinaphthyl compound providing the substituent groups are not in the 2, 2', 7, or 7' positions, as such substitution can result in the formation of coronene and anthanthene.

While the invention has been particularly described using an inert gas to dilute the reactant, the invention is not limited thereto; such dilution was made to more readily control the rate of flow of such small quantities of the reactant as were used.

Since many widely differing embodiments of the invention will occur to one skilled in the art, the invention is not limited to the specific details illustrated and described, and various changes can be made therein without departing from the spirit and scope thereof.

What is claimed is:

1. A method for the production of perylene which comprises catalytic dehydrogenation of 1, 1'-dinaphthyl in the vapor-phase on a bed of palladium-carbon at temperatures of the order of 500 degrees centigrade.

2. A method for the production of perylene which comprises passing 2 grams of 1, 1'-dinaphthyl diluted with hydrogen through a cylindrical catalyst bed of palladium-carbon about 70 centimeters long and about 10 millimeters in diameter at a rate of 1 gram per hour, said catalyst bed being maintained at temperatures between 480 and 500 degrees centigrade; whereby a mixture of 1, 1'-dinaphthyl and perylene is formed; condensing the mixture and separating the perylene by dissolving said mixture in hot benzene, cooling the hot benzene solution, and separating the precipitated crystalline perylene by filtration.

3. A method for the production of perylene which comprises passing 2 grams of 1, 1'-dinaphthyl diluted with hydrogen through a cylindrical catalyst bed of palladium-carbon about 70 centimeters long and about 10 millimeters in diameter at a rate of 1 gram per hour, said catalyst bed being maintained at temperatures between 480 and 500 degrees centigrade whereby a mixture of 1, 1'-dinaphthyl and perylene is formed; condensing the mixture and separating the mixture by selective adsorption on activated alumina and "Super-Cel" from a benzene solution, forming a chromatogram with petroleum ether, eluting the colored band with hot benzene, filtering the hot solution; cooling the filtrate to precipitate perylene, and recovering the perylene by filtration.

MILTON ORCHIN.

REFERENCES CITED

The following references are of record in the file of this patent:

UNITED STATES PATENTS

| Number | Name | Date |
| --- | --- | --- |
| 1,977,768 | Kuhrmann | Oct. 23, 1934 |
| 2,126,360 | Vollman et al. | Aug. 9, 1938 |

OTHER REFERENCES

Thomas, Anhydrous Aluminum Chloride in Org. Chem., page 648, (1941).